United States Patent [19]

Bradshaw

[11] Patent Number: 5,446,085
[45] Date of Patent: Aug. 29, 1995

[54] POLYMERIC COMPOSITIONS CONTAINING INORGANIC FILLERS AND USE THEREOF

[75] Inventor: Richard L. Bradshaw, Tucson, Ariz.

[73] Assignee: International Business Machines Corporation, Armonk, N.Y.

[21] Appl. No.: 76,896

[22] Filed: Jun. 15, 1993

[51] Int. Cl.$^6$ .............. C08L 75/00; C08L 27/00; C08L 51/00; C08L 69/00
[52] U.S. Cl. ..................... 524/507; 524/430; 524/431; 524/435; 524/437; 524/439; 524/440; 524/525; 524/527; 524/537
[58] Field of Search ............ 428/425.9; 524/430, 524/431, 435, 437, 439, 440, 492, 493, 495, 496, 507, 525, 527, 537

[56] References Cited

U.S. PATENT DOCUMENTS

| | | | |
|---|---|---|---|
| 4,525,424 | 6/1985 | Bradshaw | 428/425.9 |
| 4,568,611 | 2/1986 | Amirsakis et al. | 428/425.9 |
| 4,659,626 | 4/1987 | Fukushima et al. | 428/425.9 |
| 4,699,844 | 10/1987 | Okita et al. | 428/425.9 |
| 4,716,077 | 12/1987 | Okita et al. | |
| 4,784,907 | 11/1988 | Matsufuji et al. | 428/328 |
| 4,784,914 | 11/1988 | Matsufuji et al. | 428/418 |
| 4,795,672 | 1/1989 | Takeda et al. | 428/216 |
| 4,970,121 | 11/1990 | Tokunaga et al. | 428/412 |
| 5,034,271 | 7/1991 | Miyoshi et al. | 428/323 |
| 5,035,856 | 7/1991 | Koyama et al. | 428/328 |
| 5,063,119 | 11/1991 | Ishida et al. | 428/694 |
| 5,069,807 | 12/1991 | Ohkubo | 252/62.54 |
| 5,079,085 | 1/1992 | Hashimoto et al. | 428/327 |
| 5,084,341 | 1/1992 | Hashimoto et al. | 428/328 |
| 5,085,941 | 2/1992 | Ohkubo | 428/425.9 |
| 5,094,916 | 3/1992 | Sasaki et al. | 428/425.9 |
| 5,153,053 | 10/1992 | Hashimoto et al. | 428/215 |
| 5,153,079 | 10/1992 | Sasaki et al. | 428/694 |
| 5,178,953 | 1/1993 | Anglin . | |

FOREIGN PATENT DOCUMENTS

| | | |
|---|---|---|
| 0256351A2 | 2/1988 | European Pat. Off. . |
| 0306903A2 | 3/1989 | European Pat. Off. . |
| 0463601A2 | 1/1992 | European Pat. Off. . |
| 4222015A1 | 5/1987 | Germany . |
| 60-119632 | 6/1985 | Japan . |
| 60-119633 | 6/1985 | Japan . |
| 105220 | 2/1989 | Japan . |
| 4-61617 | 2/1992 | Japan . |

OTHER PUBLICATIONS

Bradshaw, et al., Polyester-Polyurethane Interactions with Chromium Dioxide, Polymers in Information Storage Technology, Plenum Publishing Corporation (1989), pp. 385-405.

Bradshaw, et al., Archival Stability of IBM 3480/3490 Cartridge Tapes, IEEE Transactions of Magnetics, vol. 27(5), 1991, pp. 4388-4395.

Primary Examiner—Peter A. Szekely
Attorney, Agent, or Firm—Pollock, Vande Sande & Priddy

[57] ABSTRACT

A composition comprising an inorganic filler and binder component containing a glassy polymer and a rubbery polymer is provided. The glassy polymer contacts and encapsulates the filler. The compositions are especially useful in the fabrication of flexible magnetic recording media and abrasive articles.

14 Claims, 5 Drawing Sheets

5,446,085

POLYMERIC COMPOSITIONS CONTAINING INORGANIC FILLERS AND USE THEREOF

DESCRIPTION

1. Technical Field

The present invention is concerned with polymer compositions that are reinforced with inorganic filler and use of the compositions, especially in the fabrication of flexible magnetic recording media and abrasive articles. More particularly, the compositions of the present invention provide tough, cohesive, high modulus coatings. According to the present invention, a polymer component containing a glassy resin and a rubbery polymer is employed wherein the glassy resin is in contact with and encapsulates the inorganic filler.

2. Background Art

Various types of bonding materials are useful in the fabrication of filled synthetic polymer compositions. Certain of these synthetic polymer compositions have been used for fabricating flexible magnetic recording media. Another application of importance, especially from a commercial point of view, involves fabricating abrasive articles. In both of these areas of use, the interactions between the inorganic filler and binder can effect critical characteristics of the final composition, and therefore, its applicability for practical use. This is especially important since in both magnetic recording media applications and abrasive articles, high filler loading is employed which makes it necessary to have strong interactions between the filler particles and binder.

In addition, high density recording requires tape coatings to be fabricated with increasingly smaller magnetic particles. However, current binder systems do not adequately address the need for optimized binder-filler interaction and coating mechanical requirements. In fact, current binder systems produce excessive debris and contamination of the recording interface. For instance, it has been particularly difficult to achieve useful reinforcement of conventional binders when filled with stabilized iron metal particles, or of aluminum oxide (alumina) particles, typically included along with iron metal or other non-abrasive particulate media, as head cleaning agents. In addition, due to the lack of significant chemical interaction with the oxide protective layer on these particles, the results appear to indicate considerable sensitivity to not only the source and type of particle, but also variations from within the same lot of material in the case of iron metal powders.

In fact, as compared to chromium dioxide particles, the interaction of iron and similar particles with various binders is significantly less. For example, polyurethanes, which are quite suitable when used with chromium dioxide particles, are not acceptable when used as the binder for iron and iron oxide particles.

SUMMARY OF INVENTION

The present invention makes it possible to overcome problems associated with prior art formulations, and especially with respect to toughness, cohesive integrity and adhesion between the filler and polymer component. In particular, the present invention is concerned with a composition that comprises an inorganic filler and a binder component.

The binder component employed pursuant to the present invention includes a glassy polymer and a rubbery polymer. The glassy polymer has a glass transition temperature of at least about 60° C. The glassy polymer also has polar groups capable of interacting with adsorption sites on the surface of the inorganic filler.

The rubbery polymer employed has polar groups and is compatible with the glassy polymer.

The relative amounts of the glassy polymer and rubber polymer are about 50% to about 80% by weight of the glassy polymer and correspondingly, about 20% to about 50% of the rubbery polymer based upon the total of the glassy polymer and rubber polymer.

The relative amounts of the inorganic filler and binder component are about 35% to about 60% by volume, and preferably, about 40% to about 50% by volume of filler and correspondingly, about 65% to about 40% by volume, and preferably, about 50% to about 40% by volume of the binder component.

The glassy polymer is in contact with and encapsulates the inorganic filler.

The present invention is also concerned with a magnetic recording media, comprising a substrate coated with the composition as defined hereinabove, wherein the inorganic filler includes ferromagnetic pigment.

A further aspect of the present invention is concerned with abrasive articles which are fabricated from the composition as defined hereinabove, wherein the inorganic filler contains abrasive grains.

A still further aspect of the present invention is concerned with the preparation of the compositions defined hereinabove. In particular, the method of preparation comprising the following steps:

forming a premix of the inorganic filler, the glassy polymer defined hereinabove, and an organic diluent which contains a volatile polar organic solvent, and adding to said premix the rubbery polymer defined hereinabove; and providing in the composition, a high boiling diluent wherein said high boiling diluent is a non-solvent for said glassy polymer; and thereby causing said glassy polymer to adsorb onto said inorganic filler and interact with sites on the filler to thereby encapsulate said filler and wherein said rubbery polymer becomes interwinned within the matrix of said glassy polymer.

Another aspect of the present invention is concerned with compositions obtained by the above disclosed method of preparation.

BEST AND VARIOUS MODES FOR CARRYING OUT INVENTION

Figure 1:
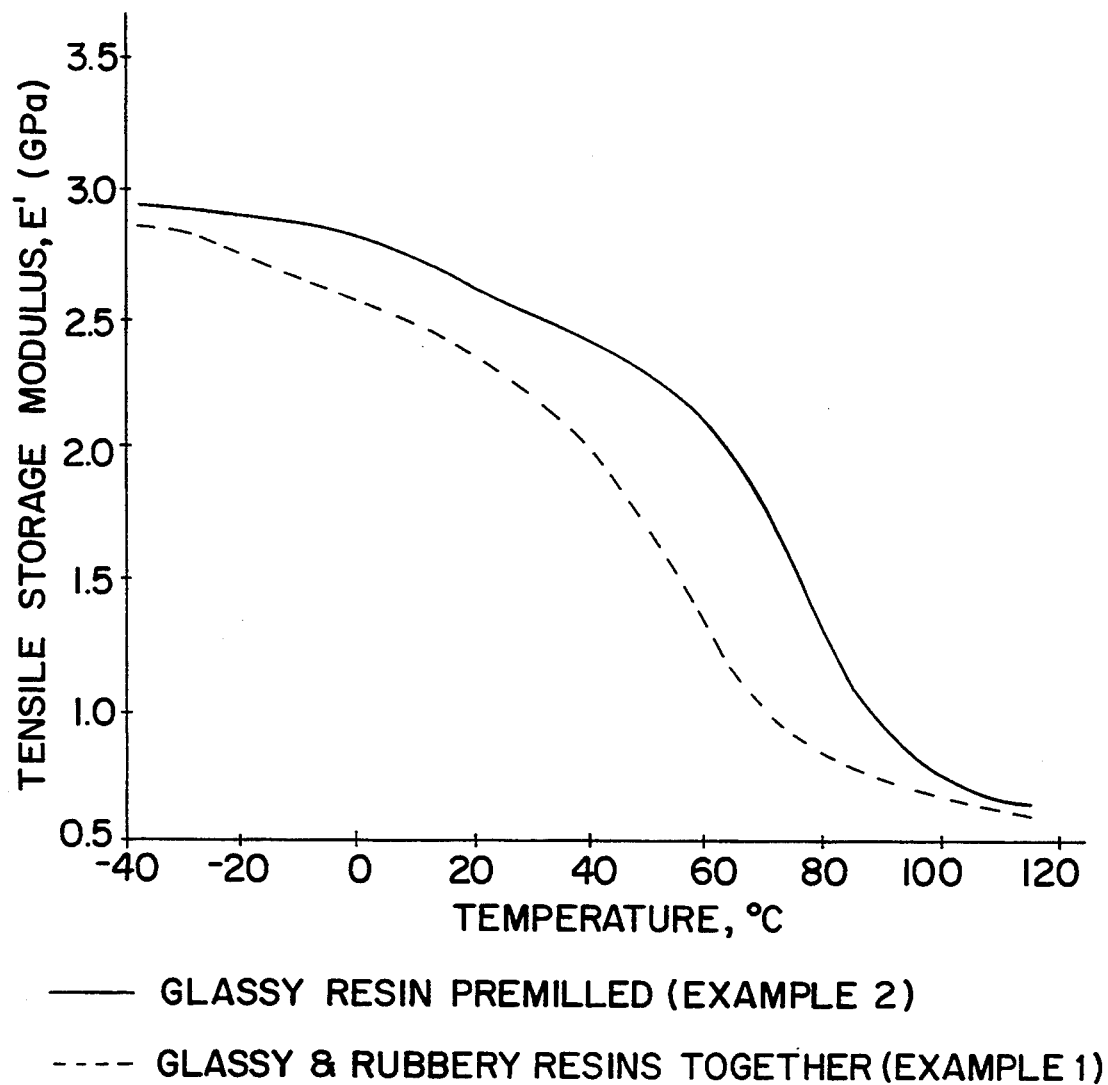
FIG. 1 illustrates the Tensile Storage Modulus v. Temperature for composition of the present invention, as compared to a composition outside the scope of the invention.

The compositions of the present invention comprise an inorganic filler and a binder component. The relative amounts of the inorganic filler and binder component are about 35 to about 60% by volume, and preferably, about 40% to about 50% by volume of inorganic filler, and correspondingly about 65 to about 40% by volume, and preferably, about 50% to about 40% by volume of the binder component. These amounts are based upon the total volume of the filler and binder component in the composition.

Typical fillers employed when the compositions are to be used for fabricating magnetic recording media are ferromagnetic particles, including iron metal, iron oxide, cobalt-modified iron oxide, and magnetic ferrites, such as barium ferrite, and mixtures thereof. In addition, the filler can include minor amounts, such as up to about 10% by weight, and more typically, when present, about 2 to about 5% of non magnetic particles, such as alumina, zirconia, silica and carbon. The fillers are preferably high surface area particles, such as those having a surface area of at least about $40M^2/gm$ and preferably about $40M^2/gm$ to about $50M^2/gm$. Certain of the fillers, such as carbon and silica, can have extremely large surface areas, such as up to about $1000M^2/gm$.

In the case of abrasive articles, abrasive grains are employed, which include aluminum oxide, silicon carbide, boron carbide, corundum, garnet, emery and mixtures thereof. The grit size is of the usual grades as graded by the United States Bureau of Standards. These abrasive materials and their uses for particular jobs are understood by persons skilled in the art, and are not altered in the abrasive articles contemplated by the present invention. In addition, inorganic fillers can be employed along with the abrasive grit in preparing abrasive articles. It is typical that at least about 85% of the inorganic fillers have average particle size no greater than 200 mesh. It is more typical that at least about 95% of the inorganic filler has an average particle size no greater than 200 mesh. Some inorganic fillers include cryolite, fluorospar, silica and the like. When an inorganic filler is employed along with the abrasive grit, it is generally present in amounts from about 1 to about 30% by weight, based upon the combined weight of the abrasive grit and inorganic filler.

The inorganic fillers employed pursuant to the present invention contain adsorption sites, typically unhydrated oxide sites and/or hydrated oxide sites, with which the glassy polymer interacts.

The binder component employed includes a glassy polymer and a rubbery polymer. The relative amounts of the glassy polymer and rubbery polymer are about 50% to about 80%, and preferably about 50% to about 60% by weight of the glassy polymer, and correspondingly, about 20% to about 50% by weight, and preferably about 40% to about 50% by weight of the rubbery polymer. These amounts are based upon the weight of glassy polymer and rubbery polymer in the binder component.

The glassy polymer employed pursuant to the present invention must have a glass transition temperature of at least about 60° C., and preferably at least about 80° C., and most preferably about 80° C. to about 100° C. The glass transition temperature referred to herein, as would be understood by those skilled in the art, refers to the primary or predominant glass transition temperature. In addition, the glassy polymer must contain polar groups that are capable of interacting with adsorption sites on the filler. Typically, the glassy polymers contain at least about 10 mole % of polar groups in the polymer backbone. Typically, the glassy polymers contain no more than about 60 mole % polar groups in the polymer backbone. Moreover, the glassy polymers can also include pendant or side chain functionality of less than about 2 mole %. Examples of suitable polar groups are ester groups, nitrile groups, amino groups, carboxylate groups (e.g., COOH), sulfonate groups and phosphate groups. The sulfonate and phosphate groups include both the acid, as well as the alkali metal and $C_{1-4}$ hydrocarbon derivatives thereof.

Examples of suitable glassy polymers are polymers of ethylenically unsaturated monomers or acetylenically unsaturated monomers, such as polymers from vinylacetate; vinylchloride; acrylic acid; methacrylic acid; acrylates including alkyl acrylates, such as ethyl acrylate, methyl acrylate, and butyl acrylate; glycidyl acrylate; and hydroxyalkyl acrylates, such as hydroxyethyl acrylate and hydroxypropyl acrylate; methacrylates including alkyl methacrylates, such as methyl methacrylate; ethyl methacylate and butyl methacrylate; glycidyl methacrylate; and hydroxyalkyl methacrylates such as hydroxyethyl methacrylate, and hydroxymethyl methacrylate; allyl alcohol, olefins such as ethylene, propylene and butylene; styrene; acrylonitrile and copolymers thereof. Also suitable as the glassy polymer are epoxy acrylate or methacrylate reaction products (e.g., reaction products of monoethylenically unsaturated carboxylic acid and bisphenol A-diglycidyl ether epoxide; urethane acrylate reaction products; polycarbonates; phenoxy polymers, phenolics such as phenol-formaldehyde polymers; and cellulosic polymers, such as cellulose acetate and cellulose nitrate.

In addition, the glassy polymer can be a polyether polyurethane, a polyester polyurethane, or a polycarbonate polyurethane. In such case, the polar groups are predominantly carbomate groups and ester groups. Typical polyurethanes suitable as the glassy polymer are the same as those disclosed hereinbelow for the rubbery polymer, expect that the amount of hard segment is such that the glass transition temperature is at least about 60° C., and typically, contains about 50% to about 65% of hard segment.

Furthermore, the glassy polymers employed pursuant to the present invention have a weight average molecular weight (Mw) of less than about 60,000 and a Mn number average molecular weight (Mn) greater than about 5000. Moreover, in those situations when it is desired to ensure against corrosion of, for instance, head gap metals, the polymers employed are preferably free of chlorine or chloride groups that can possibly result in dehydrohalogenation and subsequent corrosion. Therefore, in such case, it is preferred not to use vinyl chloride polymers.

If desired, the glassy polymer can be curable, such as chemically, with an isocyanate, epoxy and/or with radiation (e.g., electron, beam or actinic light). In the event the glassy polymer is curable, the amount of crosslinking sites should be no more than 10% mole, preferably no more than 5% mole, and most preferably, up to about 2% mole of the glassy polymer. It has been found that larger amounts of crosslinking sites increase stress on the filler to an undesired extent and thereby tending to separate from the filler surface.

The rubbery polymer employed pursuant to the present invention must also contain polar groups and be compatible with the glassy polymer. Typical polar groups on the rubber polymer are carbamate groups, ester groups, hydroxyl groups and carboxylate groups, and preferably carbamate. The rubbery polymer can be a polyether urethane, a polyester urethane, or polycarbonate urethane, and preferably, has a weight average molecular weight (Mw) of less than about 50,000 and a number average molecular weight (Mn) of greater than about 5000. The rubbery polymer typically has about 2 to about 20 mole % polar groups in the polymer backbone chain. Also, the rubbery polymer can have pendant or side chain functionality of less than 2 mole %.

Typically, the rubbery polymer has a glass transition temperature of about 50° C. or less, more typically, about −40° C. to about 50° C., and preferably, about 0° C. to about 50° C. In addition, the rubbery polymer can include crosslinking sites in an amount of up to about 10 mole %; preferably up to about 5 mole % and, and more preferably, up to about 2 mole %.

the polyurethanes are hydrolytically stable and contain a hard segment and soft segment, as described in U.S. Pat. Nos. 4,525,424 and 4,568,611, disclosures of which are incorporated herein by reference. However, the polyurethane contains about 20 to 40% of the hard segment and the molecular weight of the soft segment is about 800 to about 4000. Typical thermoplastic polyurethanes are reaction products of:

(A) A hydroxy-terminated polyether, hydroxy terminated polycarbonate, or hydroxyl-terminated polyester. The hydroxy-terminated polyethers, polyesters and polycarbonates exhibit a hydroxyl number of about 50 to about 260;

(B) a diol chain extender (typically 1,4-butanediol; 1,3-butanediol; 1.5-pentanediol; 1,6-hexanediol; and 2,5-hexanediol, and mixtures of 1,4-butanediol and 1,6-hexanediol), in order that the hydroxyl number of the polyester and the chain extender together is about 130 to about 350; and (C) an aromatic diisocynate (4,4'-diphenylmethane diisocyanate (MDI) is typical. In addition, the constituents (A), (B) and (C) are used in a proportion to yield a polyurethane of hard segment content in the range of about 20 to 40 percent by weight.

Exemplary hydroxy-terminated polyesters are reaction products of a hydroxyticallly stable difunctional alcohol and a dicarboxylic acid. Typical difunctional alcohols are 1,4-cyclohexane-dimethanol, ε-caprolactane, and 2,3 dimethyl 1,3 propane diol. Typical dicarboxylic acids are adipic, azelaic, 1,12-dodecanediodic acid, hexanedioic acid, nonanedioic acid and octanedioic acid.

Examples of some specific suitable glassy polymers and rubbery polymers, along with a discussion of certain properties thereof, are given in Table 1 herein below. Moreover, the selection of particular glassy polymers and rubbery polymers can be carried out by those skilled in the art, once aware of the above disclosure of polymer parameters, and requirements without undue experimentation. Therefore, such need not be described herein in any greater detail.

In addition, as known in the art, the composition can include auxiliary components such as lubricants, dispersants and other minor additives.

It is critical to the success of the present invention that the glassy polymer interact with adsorption sites on the surface of the inorganic filler, so that such is in contact with and encapsulates the inorganic filler. In order to accomplish this, the glassy polymer defined above, the inorganic filler and an organic diluent that contains a volatile polar organic solvent is provided in a premix. The volatile polar solvent typically has a boiling point of less than 90° C., and is capable of dispersing the inorganic filler and glassy polymer. Typical volatile polar solvents include acetone, methyl ethyl ketone, and preferably tetrahydrofuran. If desired, the organic diluent can also contain a secondary higher boiling diluent that is a non solvent for the glassy polymer. However, the organic diluent should not contain more than 20% by weight of the higher boiling secondary diluent. Such higher boiling diluent has a boiling point greater than 90° C., and includes higher boiling ketones, such as methylisobutyl ketone, acetates such as amyl acetate and ethyl acetate, hydrocarbons, including octane, isooctane and decane, and aromatic solvents such as xylene and toluene. The secondary diluent is a non solvent for the glassy polymer, but can be a partial solvent for the rubbery polymer. The lower volatile polar solvent is a better solvent for the glassy polymer than is the secondary diluent.

If curable sites are present on the glassy polymer and/or rubbery polymer, such sites should preferentially phase separate onto the secondary diluent, such that subsequent cross-linking occurs between the glassy region and rubber region.

The premix typically contains about 20 to about 50% by weight of the inorganic filler, and about 2 to about 20% by weight of the glassy polymer in the premix, with the remainder being the organic diluent, and if desired, the auxiliary ingredients, if employed. The premix is agitated so as not to cause destruction of the inorganic filler therein.

Figure 5:
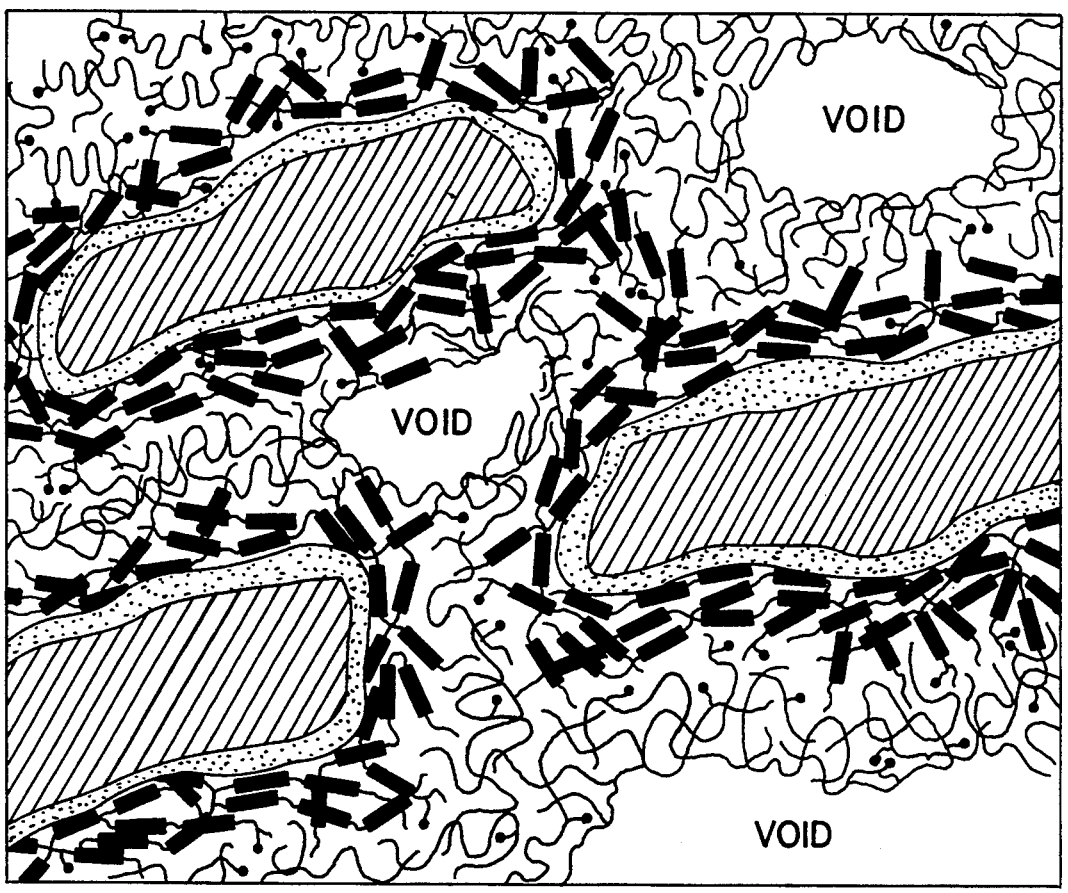
FIG. 5 is a schematic illustration of the compositions of the present invention.

The rubbery polymer and premix are combined. In addition, the secondary diluent is included to provide a diluent blend that contains about 70 to about 90% by weight of the volatile polar solvent, and correspondingly about 10 to about 30% by weight of the secondary diluent. Upon coating the composition onto a substrate, and upon evaporation of the more volatile solvent, the glassy polymer is caused to adsorb onto the inorganic filler and interact with adsorption sites on the inorganic filler to thereby encapsulate the filler. At the same time, since the rubbery polymer is soluble or at least swellable in the higher boiling secondary diluent, such can absorb stresses of the drying without disruption of the particle-/glassy resin interface. By controlling the phase separation and composite morphology, a tough, cohesive, high modulus coating is provided. The glassy resin is fabricated into a cohesive, flexible coating, by linking the filler encapsulated hard phases with a rubbery phased component to form a reinforced-rubber type mechanical response. The rubbery polymer becomes intertwined with the glassy resin. Also, depending upon the chemical nature of the glassy resin and rubbery polymer, there may be some crosslinking between them. FIG. 5 schematically illustrates the configuration of the filled compensation pursuant to the present invention.

A typical substrate when providing a flexible magnetic recording media is a flexible substrate, such as polyethylene terephthalate to form magnetic recording tape.

Figure 2:
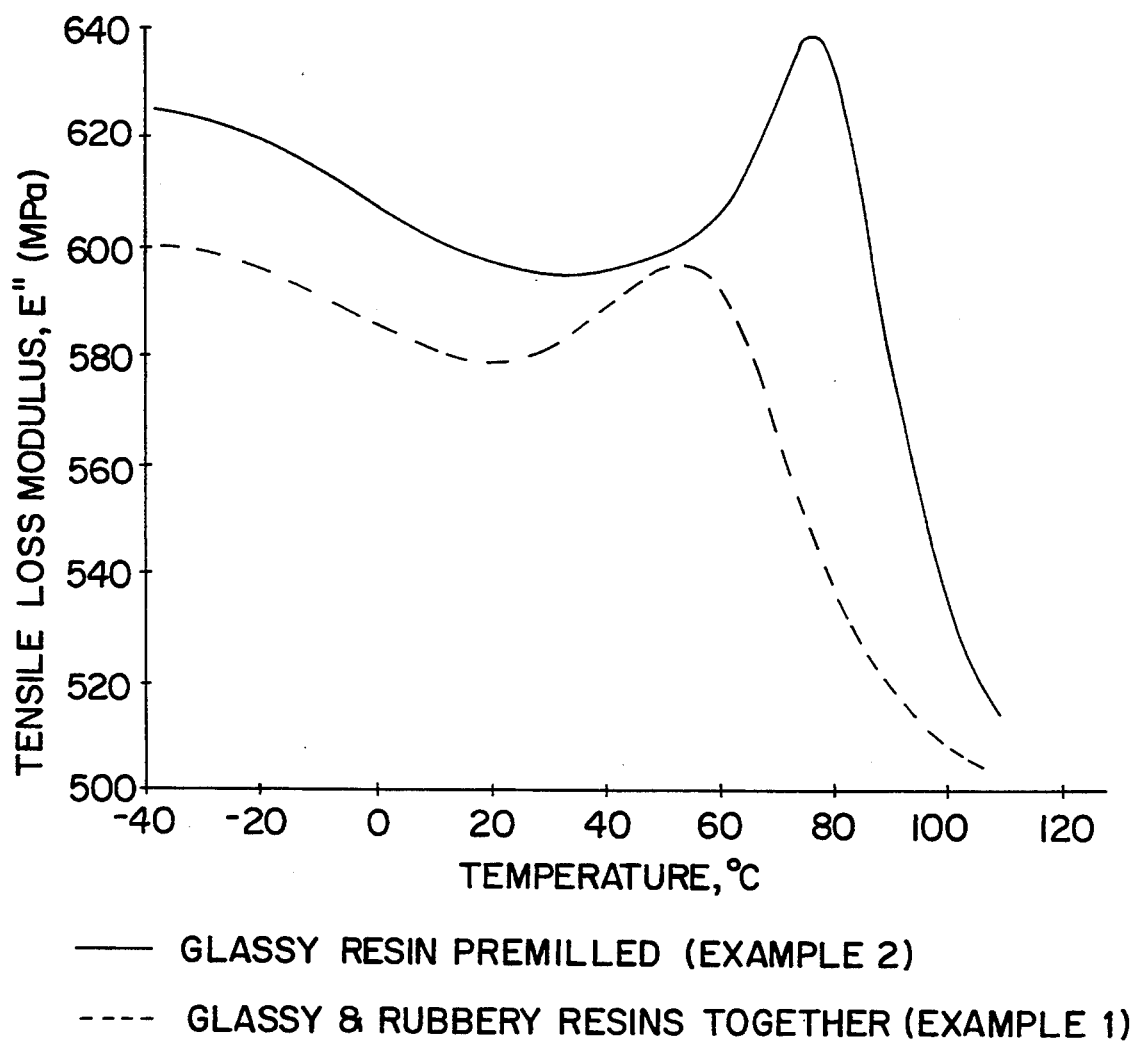
FIG. 2 illustrates the Tensile Loss Modulus v. Temperature for composition of the present invention, as compared to a composition outside the scope of the invention.

The following non-limiting examples are presented to further illustrate the present invention. In particular, Table 1 gives specific examples of glassy polymers and rubbery polymers suitable for use in the present invention. Comparison Example 1 illustrates a composition having the same ingredients and amounts as in Example 2, except that such was not prepared according to the procedure of forming a premix of the glassy polymer and inorganic filler and, therefore, did not have the same final composition configuration as achieved, pursuant to the present invention. The glassy polymer employed in Examples 1 and 2 is VCAR VROH and the rubbery polymer is Estane 5706. The results of Tensile Storage Modulus v. Temperature are shown in FIGS. 1 and 2, respectively, and clearly illustrate the significantly improved results achieved by the present invention.

In particular, the glass transition temperatures achieved by the present invention are significantly higher than those obtained outside the scope of this invention. Also, the mechanical response achieved by the present invention is more representative of a rubber reinforced polymer composition.

Figure 3:
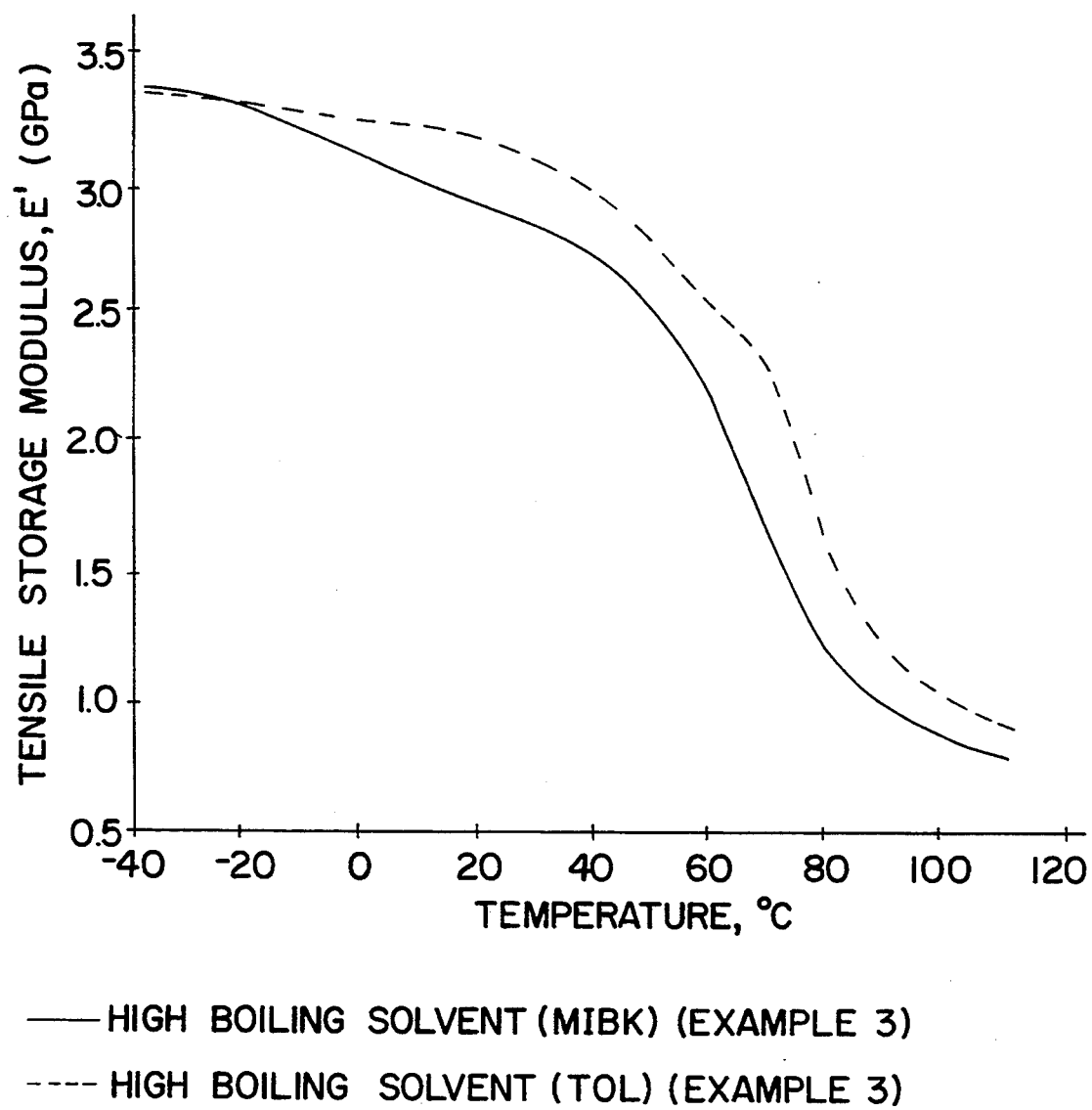
FIG. 3 illustrates Tensile Storage Modulus v. Temperature for compositions of the present invention, using different solvents.
Figure 4:
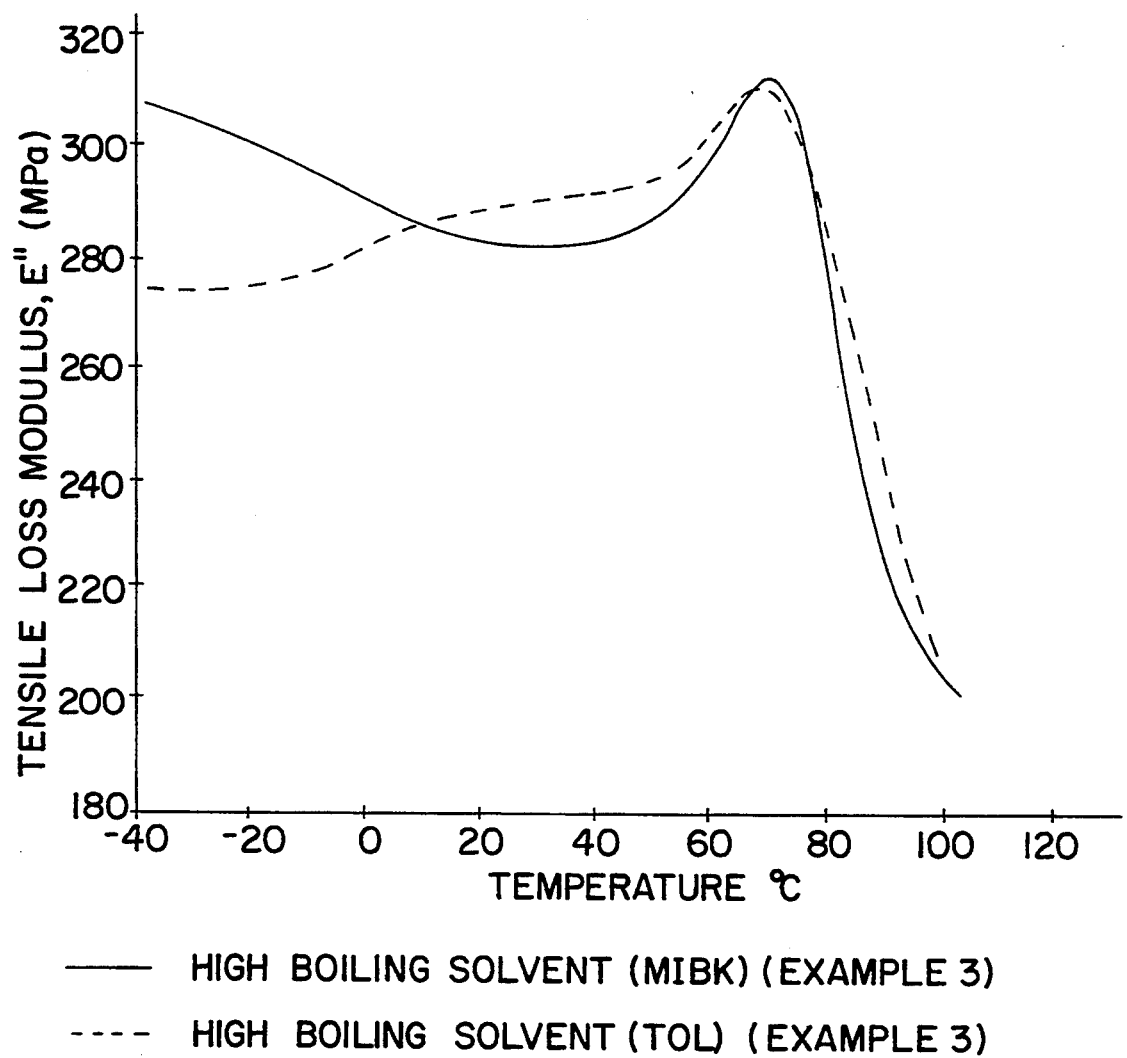
FIG. 4 illustrates Tensile Loss Modulus v. Temperature for compositions of the present invention using different solvents.

Example 3 illustrates compositions of the present invention employing either methyl isobutyl ketone or toluene with the results of Tensile Storage Modulus v. Temperature; and Tensile Loss Modulus v. Temperature shown in FIGS. 3 and 4, respectively. The glassy resin employed was VCAR VROH and the rubber polymer employed was Estane 5706.

Example 4 below illustrates compositions of the present invention wherein the filler is alumina. The glassy resin employed was VAGH and the rubber polymer employed was Estane 5706.

Table III illustrates various compositions, along with a discussion of mechanical properties prepared, pursuant to Example 3.

Table IV illustrates various compositions, along with a discussion of mechanical properties prepared, pursuant to Example 4.

TABLE I

Example Resin Properties

| Polymer Type | Trade Name | Mol. Wt (Mn) | Tg °C. |
|---|---|---|---|
| Rubbery Resin Components | | | |
| Non-functionalized Resins | | | |
| Polyether Polyurethane | Estane 5714 | 30,000 | −47 |
| Polyester Polyurethane | Morthane CA 250 | 36,000 | 12 |
| | Estane 5701 | 40,000 | −6 |
| | Estane 5706 | 38,000 | 48 |
| | Morthane CA 371 | 45,000 | 35 |
| Polycarbonate Polyurethane | Estane 5788 | 32,000 | 16 |
| Functionalized Resins | | | |
| Polyester Polyurethane | | | |
| [—PO₃ group] | Expt Resin X78 | 16,000 | 16 |
| | Expt Resin X82 | 3,000 | 18 |
| [—CO₃ group] | Morthane CA 328 | 20,000 | 26 |
| | Expt Resin X92 | 45,000 | 16 |
| Glassy Resin Components | | | |
| Poly(vinyl chloride) | Geon 27 | 20,000 | 55 |
| Poly(vinyl chloride-vinyl acetate-vinyl alchohol) | UCAR VAGH | 40,000 | 68 |
| | UCAR VAGF | 35,000 | 66 |
| Poly(vinyl chloride-vinyl acetate-hydroxy ethyl acrylate) | UCAR VROH | 8,000 | 60 |
| Phenoxy (polycarbonate) | Phenoxy PKHH | 30,000 | 88 |
| Nitrocellulose | Hercules RS 5-6 | 35,000 | 66 |
| Polyester-Polyurethane | Expt Resin X90 | 7,000 | 68 |

Tg as determined by the onset in the plot of Tensile Storage Modulus (E') determined by dynamic mechanical analysis of a iron metal filled coating (74–78% by weight)
Morthane is a trademarck of Morton-Thiokoi Inc.
Estane is a trademark of B. F. Goodrich Co.
UCAR is a Trademark of Union Carbide Corp.

Comparison Example 1. Glassy & Rubbery Resin Blends

| Ingredient | Weight (gms) |
|---|---|
| 74% Iron Metal, 18% Binder (% by weight) | |
| a. Slurry Mixture: | |
| iron metal powder | 29.4 |
| carbon black | 1.2 |
| phosphate ester dispersant | 1.7 |
| tetrahydrofuran | 72.4 |
| methyl isobutyl ketone | 24.5 |

Slurry milled in 50 ml Eiger mill (Zirconia grinding media) for 1 hour prior to addition of soft binder and lubricants

| | |
|---|---|
| b. Binder/Lubricant Solution Mixture: | |
| rubbery polymer (polester-polyurethane) | 3.5 |
| glassy polymer (vinyl resin) | 3.5 |
| fatty acid ester lubricant | 0.7 |
| tetrahydrofuran | 20.4 |
| methyl isobutyl ketone | 6.8 |

Slurry & binder mixed in mill and milled 1 hour in 50 ml Eiger to generate final ink (22% solids) which was used to produce free films and magnetic tape.

Example 2. Glassy Resin Premilling Process

| Ingredient | Weight (gms) |
|---|---|
| 74% Iron Metal, 18% Binder (% by weight) | |
| a. Slurry Mixture: | |
| iron metal powder | 29.4 |
| carbon black | 1.2 |
| glassy polymer (vinyl resin) | 3.5 |
| phosphate ester dispersant | 1.7 |
| tetrahydrofuran | 72.4 |
| methyl isobutyl ketone | 24.5 |

Slurry milled in 50 ml Eiger mill (Zirconia grinding media) for 1 hour prior to addition of rubbery binder

| | |
|---|---|
| b. Binder/Lubricant Solution Mixture: | |
| rubbery polymer (polyester-polyurathane) | 3.5 |
| fatty acid ester lubricant | 0.7 |
| tetrahydrofuran | 20.4 |
| methyl isobutyl ketone | 6.8 |

Slurry & binder mixed in mill and milled 1 hour in 50 ml Eiger to generate final ink (22% solids) which was used to produce free films and magnetic tape.

Example 3. Preferred Solvent Process

| Ingredient | Weight (gms) |
|---|---|
| 74% Iron Metal, 18% Binder (% by weight) | |
| a. Slurry Mixture: | |
| iron metal powder | 29.4 |
| carbon black | 1.2 |
| glassy polymer (vinyl resin) | 3.5 |
| phosphate ester dispersant | 1.7 |
| tetrahydrofuran | 72.4 |

Slurry milled in 50 ml Eiger mill (Zirconia grinding media) for 1 hour prior to addition of rubbery binder.

| | |
|---|---|
| b. Binder/Lubricant Solution Mixture: | |
| rubbery polymer (polyester-polyurethane) | 3.5 |
| fatty acid ester lubricant | 0.7 |
| tetrahydrofuran | 20.4 |
| methyl isobutyl ketone or toluene | 31.0 |

Slurry & binder mixed in mill and milled 1 hour in 50 ml Eiger to generate final ink (22% solids) which was used to produce free films and magnetic tape.

Example 4. Alumina-Dispersant Milling

| Ingredient | Weight (gms) |
|---|---|
| 76% Alumina, 20% Binder (% by weight) - (50/50 Hard/Soft) | |
| a. Slurry Mixture: | |
| alumina powder | 43.5 |
| glassy polymer (vinyl resin) | 6.0 |
| phosphate ester dispersant | 1.3 |
| tetrahydrofuran | 50.3 |
| methyl isobutyl ketone or toluene | 17.0 gm |

Example 4. Alumina-Dispersant Milling

| Ingredient | Weight (gms) |
|---|---|
| | or 0.0 |

Slurry milled in 50 ml Eiger mill (Zirconia grinding media) for 40 minutes prior to addition of binder and solvents b. Binder/Lubricant Solution Mixture:

| rubbery polymer (polyester-polyurethane) | 6.0 |
|---|---|
| tetrahydrofuran | 50.9 |
| methyl isobutyl ketone or toluene | 24 gm or 17.0 gm |

Slurry & binder mixed in mill and milled 1 hour in 50 ml Eiger to generate final ink (22% solids) which was used to produce free films for mechanical analysis.

TABLE III

Mechanical Analysis of Glassy/Rubbery Polymer Resin Blends with Inorganic Filler

| | Tensile Storage 20° C. | Modulus, E' (GPa) 50° C. | Tg °C. (Onset) |
|---|---|---|---|
| 7.4% Iron Metal Powder Filled | | | |
| UCAR VAGH/Estane 5706 | | | |
| 30/70 wt. % | 2.2 | 2.0 | 58 |
| 50/50 wt. % | 3.1 | 2.7 | 56 |
| 70/30 wt. % | 2.6 | 2.3 | 60 |
| UCAR PKHH/Estane 5706 | | | |
| 30/70 wt. % | 2.8 | 2.6 | 54 |
| 50/50 wt. % | 3.6 | 2.8 | 58 |
| 70/30 wt. % | 3.4 | 3.0 | 52 |
| Exp X90/Morthane CA 371 | | | |
| 30/70 wt. % | 2.4 | 2.0 | 42 |
| 50/50 wt. % | 2.9 | 2.6 | 53 |
| 70/30 wt. % | 2.6 | 2.4 | 58 |
| Exp X90/Estane 5706 | | | |
| 30/70 wt. % | 2.5 | 2.2 | 49 |
| 50/50 wt. % | 3.2 | 3.0 | 56 |
| 70/30 wt. % | 2.8 | 2.7 | 62 | films prepared using method described in Example 3, all samples prepared using tetrahydrofuran (THF) in slurry milling stage with toluene (TOL) or methyl isobutyl ketone (MIBK) added with rubbery polymer solution (the X90 films were severely cracked when toluene was used as the non-solvent at the 25% toluene concentration described in Example 3), but quite good when using MIBK as the non-solvent.

TABLE IV

Mechanical Analysis of Glassy/Rubbery Polymer Resin Blends with Inorganic Filler

| | Tensile Storage 20° C. | Modulus, E' (GPa) 50° C. | Tg °C. (Onset) |
|---|---|---|---|
| 76% Alumina Filled | | | |
| UCAR VAGH/Estane 5706 | | | |
| 30/70 wt. % | 2.1 | 1.6 | 48 |
| 50/50 wt. % | 2.6 | 2.0 | 56 |
| 70/30 wt. % | 3.2 | 2.7 | 54 |
| UCAR PKHH/Estane 5706 | | | |
| 30/70 wt. % | 2.6 | 2.4 | 46 |
| 50/50 wt. % | 3.4 | 1.5 | 48 |
| 70/30 wt. % | 4.0 | 3.0 | 50 |
| Exp X90/Morthane CA 371 | | | |
| 30/70 wt. % | 1.8 | 1.1 | 44 |
| 50/50 wt. % | 2.8 | 2.1 | 52 |
| 70/30 wt. % | 3.6 | 3.0 | 54 | films prepared using method described in Example 4, all samples prepared using tetrahydrofuran (THF) in slurry milling stage with toluene (TOL) added with rubbery polymer solution. Toluene being the non-solvent, high boiling diluent for the glassy polymer phase.

What is claimed is:

1. A method of preparing a composition comprising:
   A) an inorganic filler having absorption sites selected from the group consisting of unhydrated oxide sites, hydrated oxide sites and mixtures thereof; and
   B) a binder component wherein said binder component comprises
      1) a glassy polymer having a glass transition temperature of at least about 60° C. and having polar groups that interact with said adsorption sites on the surface of said filler to thereby remain in contact with and to encapsulate said filler; and
      2) a rubbery polymer having polar groups and being compatible with said glassy polymer wherein the relative amounts of B)1) and B)2) are about 50% to about 80% by weight of B)1) and correspondingly about 20% to about 50% by weight of B)2) based upon the total weight of B)1) and B)2) in the composition; and wherein said glassy polymer and said rubbery polymer are chlorine free;

and wherein the relative amounts of A) and B) are about 35% to about 60% by volume of A) and correspondingly 65% to about 40% by volume of B) based upon the total volume of A) and B) in the composition;

which comprises forming a premix of the inorganic filler, the glassy polymer and an organic diluent, which contains a volatile polar organic solvent wherein said premix contains about 2 to about 20% by weight of said glassy polymer, and about 20 to about 50% by weight of said filler; and admixing said premix and the rubbery polymer; and providing in the composition a high boiling secondary diluent in an amount to provide a blend of diluent of about 70 to about 90% by weight of said volatile polar organic solvent and correspondingly about 10 to about 30% by weight of said secondary diluent; and wherein said high boiling diluent is a non solvent for said glassy polymer; and thereby causing said glassy polymer to adsorb onto said inorganic filler and interact with adsorption sites on said filler to thereby encapsulate said filler, and to intertwine said rubbery particle within the matrix of said glassy polymer.

2. The method of claim 1 wherein said volatile polar organic solvent has a boiling point of less than 90° C., and said high boiling diluent has a boiling point of greater than 90° C.

3. The method of claim 1 which further comprises evaporating said volatile polar organic solvent and said secondary diluent.

4. The composition obtained by the process of claim 3.

5. The method of claim 1 wherein the relative amounts of A) and B) are about 40% to about 50% by volume of A), and correspondingly, about 50% to about 40% by volume of B), based upon the total volume of A) and B) in the composition.

6. The method of claim 1 wherein the glass transition temperature of said glassy polymer is at least about 80° C.

7. The method of claim 1 wherein the glass transition temperature of said glassy polymer is about 80° C. to about 100° C.

8. The method of claim 1 wherein said glassy polymer contains at least about 10 mole % of said polar groups in the polymer backbone.

9. The method of claim 1 wherein said glassy polymer contains up to about 60% of said polar groups in the polymer backbone.

10. The method of claim 8 wherein said glassy polymer contains pendant side chain functionality of less than about 2 mole %.

11. The method of claim 8 wherein said glassy polymer contains up to 10 weight percent of crosslinking sites.

12. The method of claim 1 wherein said glassy polymer has weight average molecular weight (Mw) of less than about 60,000 and a number average molecular weight (Mn) greater than about 5000.

13. The method of claim 1 wherein said rubbery polymer has about 2 to about 20 mole % of polar groups in the polymer backbone chain, a weight average molecular weight (Mw) of less than about 50,000, and a number average molecular weight (Mn) of greater than about 5000.

14. The method of claim 1 wherein said rubbery polymer is a polyurethane.

* * * * *